United States Patent
Greene et al.

(10) Patent No.: US 6,182,893 B1
(45) Date of Patent: Feb. 6, 2001

(54) CUSTOMER RETAIL APPARATUS HAVING MULTIPLE CARD READER CAPABILITY

(75) Inventors: John C. Greene; Howard Weinstein, both of Greensboro, NC (US)

(73) Assignee: Marconi Commerce Systems Inc., Greensboro, NC (US)

( * ) Notice: Under 35 U.S.C. 154(b), the term of this patent shall be extended for 0 days.

(21) Appl. No.: 09/143,006

(22) Filed: Aug. 28, 1998

(51) Int. Cl.$^7$ ....................................................... G06K 5/00
(52) U.S. Cl. ........................... 235/380; 235/384; 705/413
(58) Field of Search ................................... 235/375, 380, 235/384; 705/413

(56) References Cited

U.S. PATENT DOCUMENTS

| | | | |
|---|---|---|---|
| 4,226,154 | * | 10/1980 | Easler ...................................... 84/686 |
| 4,395,626 | * | 7/1983 | Barker et al. ...................... 235/380 X |
| 4,651,299 | * | 3/1987 | Miyazaki et al. ..................... 345/418 |
| 5,200,889 | * | 4/1993 | Mori ................................. 235/380 X |
| 5,258,604 | * | 11/1993 | Behrens et al. .................. 235/462.15 |
| 5,543,897 | * | 8/1996 | Altrieth, III ............................. 399/81 |
| 5,859,416 | * | 1/1999 | Gatto ..................................... 235/384 |
| 5,913,180 | * | 6/1999 | Ryan ................................. 235/375 X |
| 6,082,618 | * | 7/2000 | Brown ................................ 235/380 X |
| 6,087,954 | * | 6/1999 | McSpadden et al. ............. 705/413 X |

FOREIGN PATENT DOCUMENTS 43 27 057 A1 * 1/1994 (DE) .

* cited by examiner

*Primary Examiner*—Michael G Lee
*Assistant Examiner*—Jared J. Fureman
(74) *Attorney, Agent, or Firm*—Coats & Bennett, P.L.L.C.

(57) ABSTRACT

A system for recording a credit or debit transaction on a fuel dispensing apparatus. The system comprises a primary card reader (PCR) for receiving data from a magnetic strip card situated on the exterior housing of the fuel dispensing apparatus and an auxiliary card reader (ACR) for receiving data from a magnetic strip card situated on the exterior housing of the fuel dispensing apparatus. The auxiliary card reader (ACR) is situated such that it is easily accessible to handicapped individuals. Also included is an interface board that accepts input from the primary and auxiliary card readers and determines which of the card readers is currently sending data. Upon determination, the interface board outputs the active card reader data to a card reader in dispenser (CRIND®) board coupled to the interface board. The CRIND® board forwards the active card reader data to a processing device in order to verify and complete the desired transaction. The system is also designed to incorporate primary and auxiliary keypad devices associated with each of the card readers.

31 Claims, 8 Drawing Sheets

CUSTOMER RETAIL APPARATUS HAVING MULTIPLE CARD READER CAPABILITY

TECHNICAL FIELD

The present invention relates to an apparatus having multiple point-of-sale card reading/keypad devices on each operable side of the fuel dispensing apparatus. More particularly, the present invention relates to a fuel dispensing apparatus having multiple point-of-sale card reading/keypad devices on each operable side of the fuel dispensing apparatus wherein the placement of one of the aforementioned card reader/keypad devices is such that it is conveniently accessible to and operated by shorter or wheelchair confined individuals.

BACKGROUND ART

U.S. Government regulatory agencies have considered regulations concerning the accessability of point-of-sale magnetic card reading fuel dispensing machines for the benefit of shorter or wheelchair confined individuals. Specifically, the Americans with Disabilities Act (ADA) requires public facilities to be "readily accessible to and usable by individuals with disabilities". Moreover, individual state action setting out even more stringent requirements has occurred. In California, for instance, code requires the highest operable part of two card readers, or 20% of card readers, whichever is greater shall be no more than 54" from the base of the fuel dispenser and that the fuel dispenser shall be mounted at grade.

As a result, a need has been created for a retail apparatus, such as, for instance, a fuel dispensing apparatus which can accommodate a second card reading device having an associated keypad for each operable side of the fuel dispensing apparatus. Applicant's invention meets this long-felt need with a novel second card reading device and keypad located on the exterior housing of a fuel dispensing apparatus such that they are conveniently accessible to and operated by handicapped individuals. The proposed retail apparatus can accommodate magnetic strip cards, bar coded cards, smart cards, RF transponders, and biometric identification medium (e.g., fingerprint) in order to authorize and process a retail transaction.

The second, or auxiliary, keypad described in the present invention is likely to be, but need not be, implemented using a security scheme described in co-pending application 09/020,378 filed Feb. 9, 1998 entitled "Keypad Scanning Security System", said co-pending application incorporated herein by reference.

DISCLOSURE OF THE INVENTION

The present invention describes a system for recording a credit or debit transaction on a fuel dispensing apparatus comprising first card reader means for receiving data from a magnetic strip card situated on the exterior housing of the fuel dispensing apparatus and second card reader means for receiving data from a magnetic strip card situated on the exterior housing of the fuel dispensing apparatus such that the second card reader means is physically accessible to handicapped individuals. The present invention further comprises an interface board accepting input from the first and second card readers and keypad devices wherein the interface board is capable of determining which of the first and second card readers and keypad devices is currently sending data. A card reader in dispenser (CRIND®) board is coupled to the interface board for accepting the output from the interface board and forwarding same to a processing device (typically a point-of-sale POS device connected to all fuel dispensing devices) in order to verify and complete the desired transaction.

CRIND® is an acronym for "Card Reader IN Dispenser" which is a style of fuel dispensing apparatus made and sold by Gilbarco, Inc. of Greensboro, NC. Usage of the term CRIND® in this application implies fuel dispensing apparatus having card reading and keypad capabilities. These capabilities typically include communication of card information to a remotely (i.e., not on the fuel dispensing apparatus) situated station controller. If desired, a CRIND® board can be configured to process touchscreen input data as well.

One object of the invention is to provide a card reader/keypad device on a fuel dispensing apparatus such that it is conveniently accessible to and operated by handicapped individuals.

It is another object of the invention to link a pair of card reader/keypad devices through an interface board to a Card Reader in Dispenser board (CRIND®) without affecting the operation of either card reader/keypad device.

Some of the objects of the invention having been stated, other objects will become evident as the description proceeds, when taken in connection with the accompanying drawings described below.

BRIEF DESCRIPTION OF THE DRAWINGS

FIG. 7 illustrates the resultant row-column matrix of the combined keypad mappings as perceived by the fuel dispensing apparatus internal microprocessor.

BEST MODE FOR CARRYING OUT THE INVENTION

Figure 1:
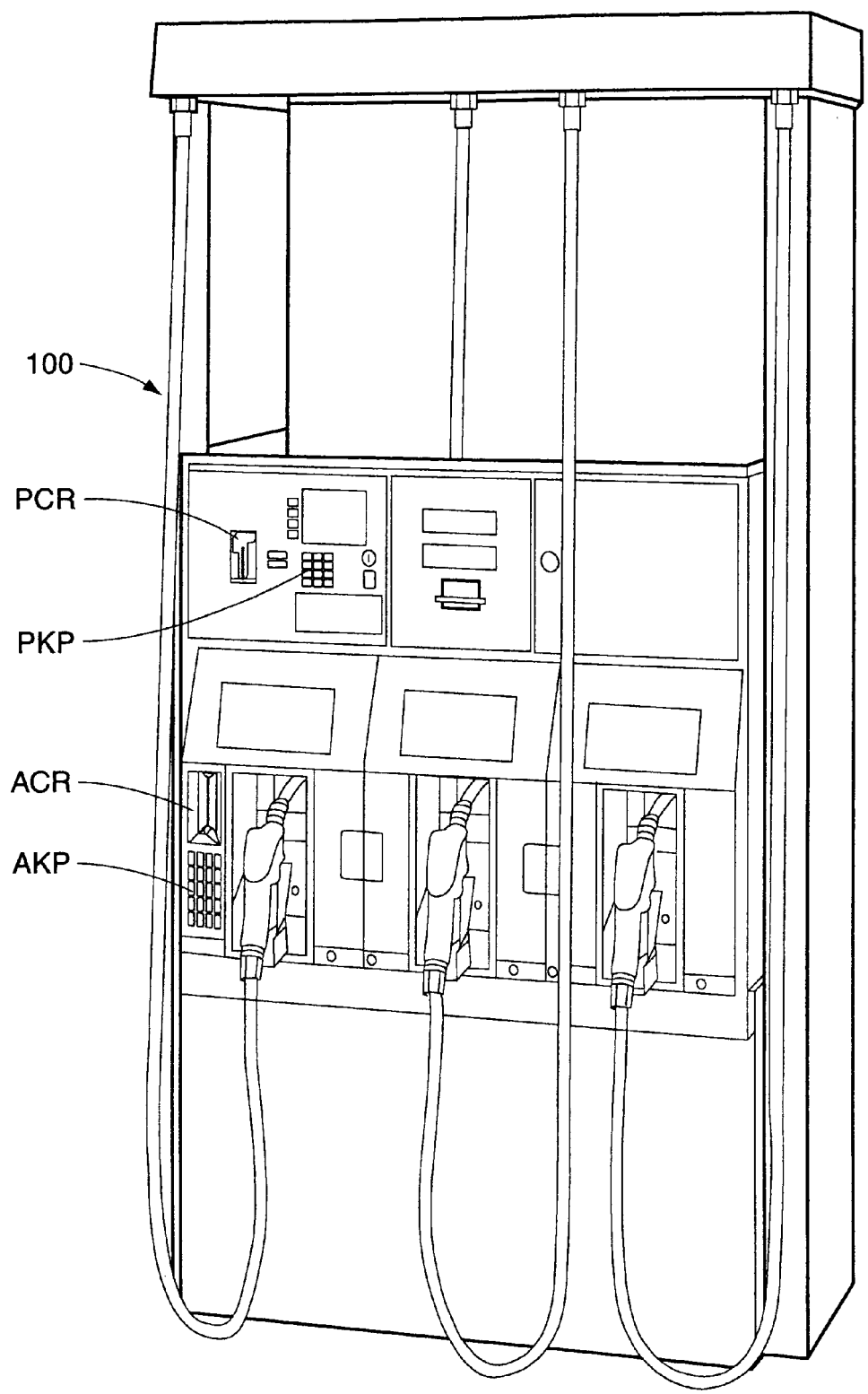
FIG. 1 illustrates an exterior perspective view of a typical fuel dispensing apparatus according to one embodiment of the present invention.

FIG. 1 illustrates an exterior perspective view of a typical fuel dispensing apparatus 100 according to one embodiment of the present invention. The card reader/keypad devices of the present invention, however, may be incorporated into other fuel dispensing apparatus designs. FIG. 1 is merely illustrative of one such design and the present invention should not be viewed as limited to being implemented within the fuel dispensing apparatus of the figure shown. In addition, a fuel dispensing apparatus is illustrated as the preferred embodiment. The invention, however, is applicable to virtually any stand-alone attendant-less retail apparatus.

A primary card reader (PCR) is shown in the upper left portion of fuel dispensing apparatus 100. Situated alongside primary card reader (PCR) is an associated primary keypad (PKP) and display. An auxiliary card reader (ACR) is shown on the far left side immediately adjacent to the left most pump of fuel dispensing apparatus 100. Similarly, its associated auxiliary keypad (AKP) is placed directly beneath auxiliary card reader (ACR). As evident from FIG. 1, auxiliary card reader (ACR) and auxiliary keypad (AKP) are positioned for easy access by handicapped individuals.

There are two (2) general types of magnetic strip card readers. The first type is referred to as an insert-type reader which reads card data upon withdrawal of an inserted magnetic strip encoded card. The second type is referred to as a swipe-type reader which reads card data during the swiping of an inserted magnetic strip encoded card through a defined slot area. Either of the card reader types can be implemented within the present invention.

Moreover, the present invention is adaptable for use with other information bearing cards in addition to magnetic strip encoded cards, including but not limited to, bar code encoded cards and biometrically encoded cards as well as RF transponders and smartcards.

Figure 2:
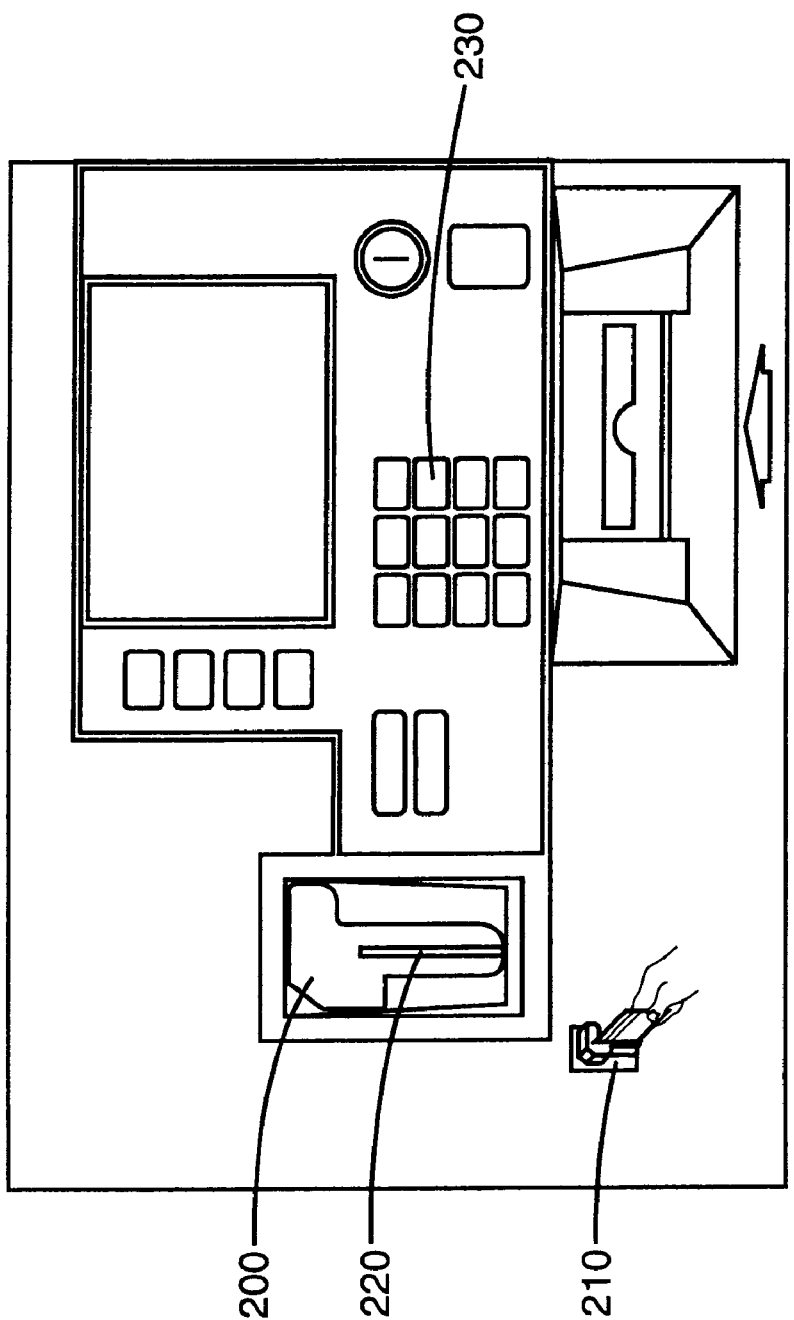
FIG. 2 illustrates an exterior perspective view of a typical insert-type magnetic card reader according to one embodiment of the present invention.

FIG. 2 illustrates an exterior perspective view of a typical insert-type magnetic card reader and associated keypad. An encoded magnetic strip card (not shown) is inserted into insert-type reader 200 and the card's data is read during withdrawal of the card from insert-type reader slot 220. Also shown is a keypad 230 for entering user responses to prompts from fuel dispensing apparatus 100. Data signals from insert-type reader 200 and keypad 230 are then processed internally as will be described later. Insert-type card reader 200 may also include surface indicia 210 that helps illustrate to consumers how to operate the card reader.

Figure 3:
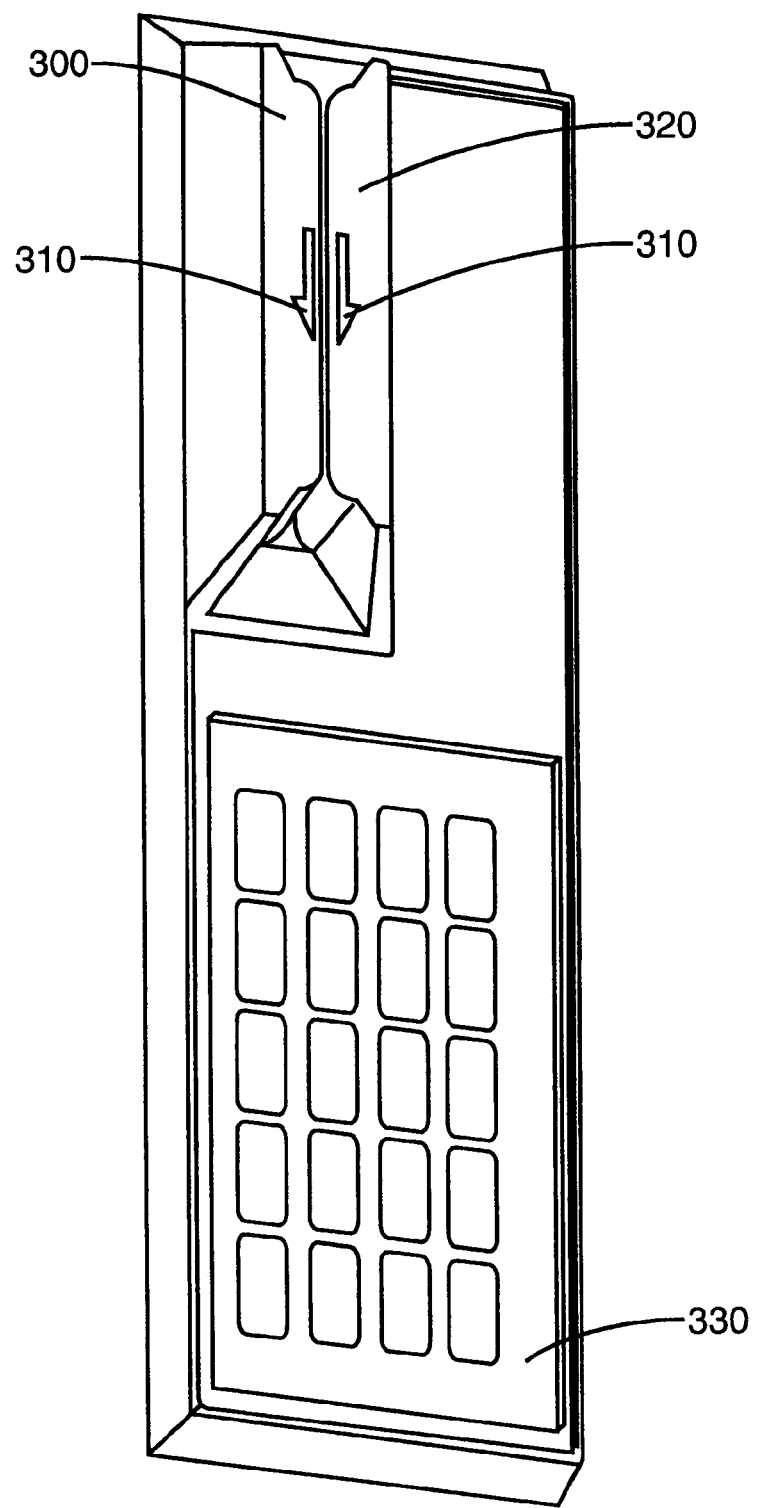
FIG. 3 illustrates an exterior perspective view of a typical swipe-type magnetic card reader according to one embodiment of the present invention.

FIG. 3 illustrates an exterior perspective view of a typical swipe-type magnetic card reader. An encoded magnetic strip card is inserted into swipe-type reader 300 and swiped in the direction of arrows 310. The card's data is read during the swipe of the card through slot 320. Also shown is a keypad 330 for entering user responses to prompts from fuel dispensing apparatus 100. Data signals from swipe-type reader 300 and keypad 330 are then processed internally as will be described later.

Figure 4:
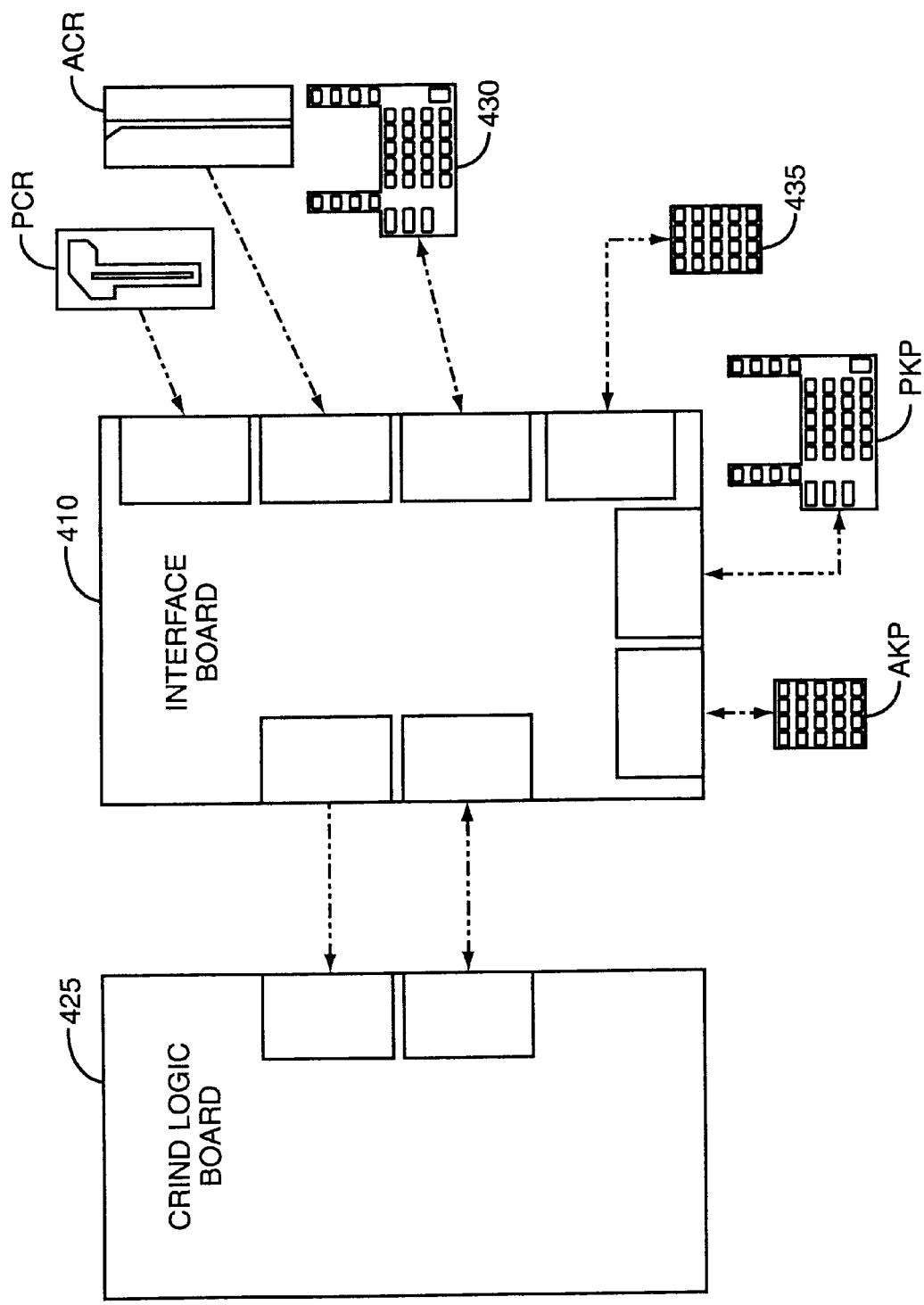
FIG. 4 illustrates a block diagram of the components that comprise one embodiment of the present invention.

FIG. 4 illustrates a block diagram of the components that comprise one embodiment of the present invention. A primary first card reader (PCR) and primary keypad (PKP) are coupled to an interface board 410. An auxiliary card reader (ACR) and auxiliary keypad (AKP) are also coupled to interface board 410. Interface board 410, in turn, is coupled to CRIND® logic board 425. As previously described, the primary (PCR) and auxiliary (ACR) card readers may be of the insert-type or swipe-type. Card readers (PCR), (ACR) and keypads (PKP), (AKP) are conventional in design and operation and are well known in the art. Interface board 410 is peculiar to the present invention and accepts input from both sets of card reader/keypad devices, distinguishes (when necessary) which card reader/keypad device is active, and forwards the data to CRIND® logic board 425 for further transaction processing.

The purpose of interface board 410 is to accept multiple card reader/keypad input sources and output a single card reader signal and keypad signal to CRIND® logic board 425. Upon receipt of output from interface board 410, CRIND® logic board 425 will process card reader/keypad data as described, for instance, in U.S. Pat. No. 5,719,781 (issued in the name of Leatherman et al. and assigned to Gilbarco, Inc. of Greensboro, NC, the common assignee of the present invention) and incorporated herein by reference.

Interface board 410 communicates with two types of card readers. The first is a standard, reciprocal swipe card reader (PCR) and the second is an auxiliary, one-way swipe card reader (ACR). The data streams of these two card readers are merged through combinational logic to form a single data stream to CRIND® logic board 425. The "Card Presence" signal of auxiliary card reader (ACR) is modified in auxiliary interface firmware to create a waveform that will distinguish auxiliary card reader (ACR) from standard card reader (PCR). This distinction allows CRIND® logic board 425 to perform special operations like printing long receipts which would be accessible from a wheelchair.

The keypads of the present invention are well known in the art and generally operate as described below. A keypad such as, for instance, one having a four (4) row, three (3) column matrix configuration similar to a standard telephone keypad, possesses a set of scan lines electrically connected to the keypad columns and a set of return lines electrically connected to the keypad rows. Each key has an associated switch which when that key is depressed creates an electrical connection between that key's scan line and return line. Depression of the key closes a circuit sending an electrical impulse or signal to a keypad scanner and processor. The processor can then determine which key has been depressed based on the particular scan/return line that returned the electrical impulse or signal.

Key presses are decoded by a scanner which detects a switch closure between a row and a column. This is achieved by having the keypad scanner generate a probe signal on one scan line of the keypad matrix while generating a different non-probe signal on the remaining scan lines. The scanner then checks the return lines for the probe signal. If the probe signal is detected on one of the return lines, the exact key pressed can be ascertained since it is known which scan line is being probed and which return line passed the probe signal. The process is then repeated for each scan line in order to scan the entire keypad matrix.

When a fuel dispenser apparatus configuration does not contain keypads (PKP) and (AKP) which will each be referred to as "SmartPads" hereinafter, the interface board 410 scans two membrane switches. The first is a standard keypad membrane switch 430 and the second is a single-line CRIND® (4×5) keyboard rotated 90° to form a (5×4) auxiliary keypad membrane switch 435. The key values returned from these two membrane switches are transmitted as a single byte per keystroke to CRIND® logic board 425. The method of keypad scanning is similar to that previously described with the following two exceptions. First, the twelve (12) keys that form the PINpad area (digits 0–9, #, and *) for both the standard and auxiliary keypads are wired in parallel so that either keypad can produce the same keystroke. Second, the eight (8) non-PINpad keys on auxiliary keypad membrane switch 435 are fed through an additional row and column scanned along standard keypad membrane switch 430. These eight (8) key values are therefore unique to auxiliary keypad membrane switch 435 and may be programmed by CRIND® logic board 425 in any way desired.

When a fuel dispenser apparatus configuration does contain SmartPads (PKP), (AKP), each SmartPad performs its own individual scan and reports keystroke values directly to CRIND® logic board 425 according to its location on the dispenser apparatus. This sense of location identifies it as either the standard (PKP) or auxiliary (AKP) SmartPad and is provided by a logic level received from interface board 410. Interface board 410 does not perform keypad scans or transmit serial data in this configuration because it would use the same serial port as the SmartPad.

Figure 5:
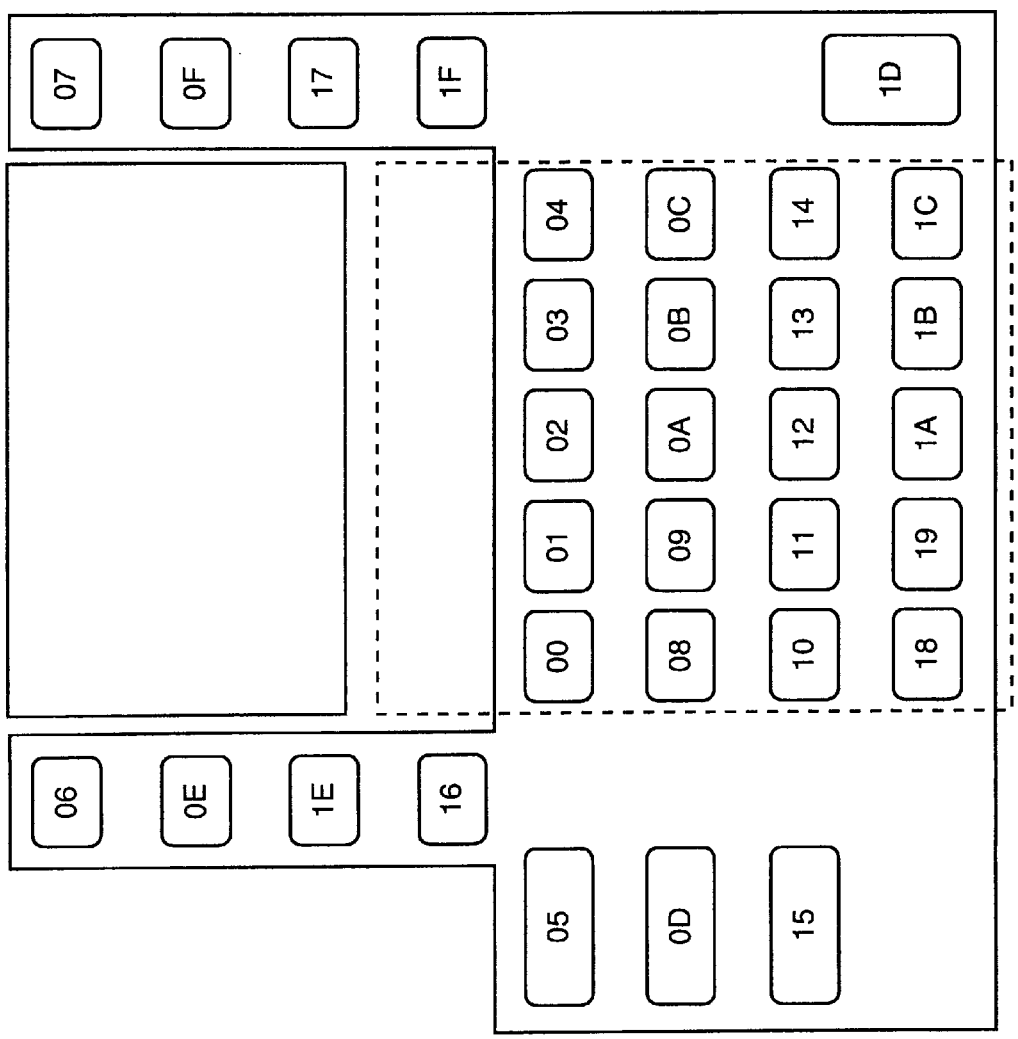
FIG. 5 illustrates the keypad mappings of the primary or standard keypad device of the fuel dispensing apparatus.

Regardless of whether keystroke information is received from interface board 410 or a SmartPad, the key values returned to CRIND® logic board 425 are determined as follows. The standard keypad mapping shown in FIG. 5 is preserved in standard keypad (PKP). The key numbers for the 32 keys are represented in hexadecimal value ranging from 00 to 1F. The single-Line CRIND® logic board uses only the keys in the enclosed dotted-line area. The PINpad keys are located in the three leftmost columns of the enclosed dotted-line area and the function keys are located in the two rightmost columns of the enclosed dotted-line area.

Figure 6:
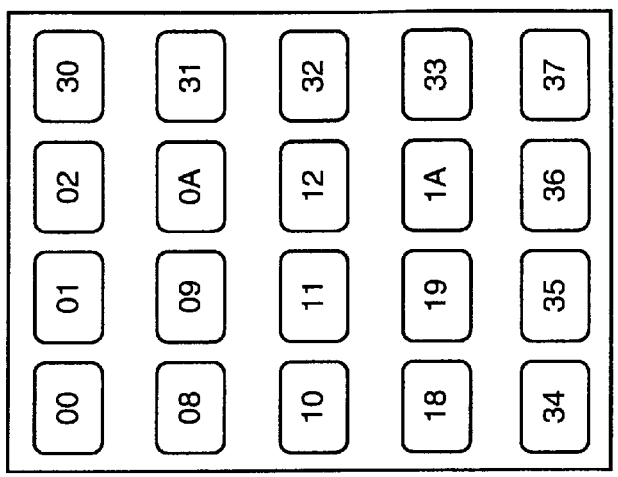
FIG. 6 illustrates the keypad mappings of the auxiliary keypad device of the fuel dispensing apparatus.

The auxiliary keypad (AKP) of FIG. 6 is constructed using a standard single-line CRIND® keypad rotated 90°. This results in a transposed row/column matrix from a (4×5) to (5×4) that does not allow for two columns of function keys due to the loss of a column.

The auxiliary keypad (AKP) mapping shown in FIG. 6 overlaps the standard mapping only in the PINpad key area. The PiNpad keys are fixed in the three leftmost columns and four uppermost rows. Their hexadecimal key values overlap those of the standard keypad mapping. Function keys are located in the remaining locations and have the unique hexadecimal key values shown. These unique values allow the CRIND® BIOS (Basic Input/Output System) to re-map their function to mirror or duplicate any non-PINpad key on the standard keypad or to perform a wholly different function. It is anticipated that wheelchair specific functions would and could be developed and mapped for the remaining eight (8) keys on auxiliary keypad (AKP).

Figure 7:
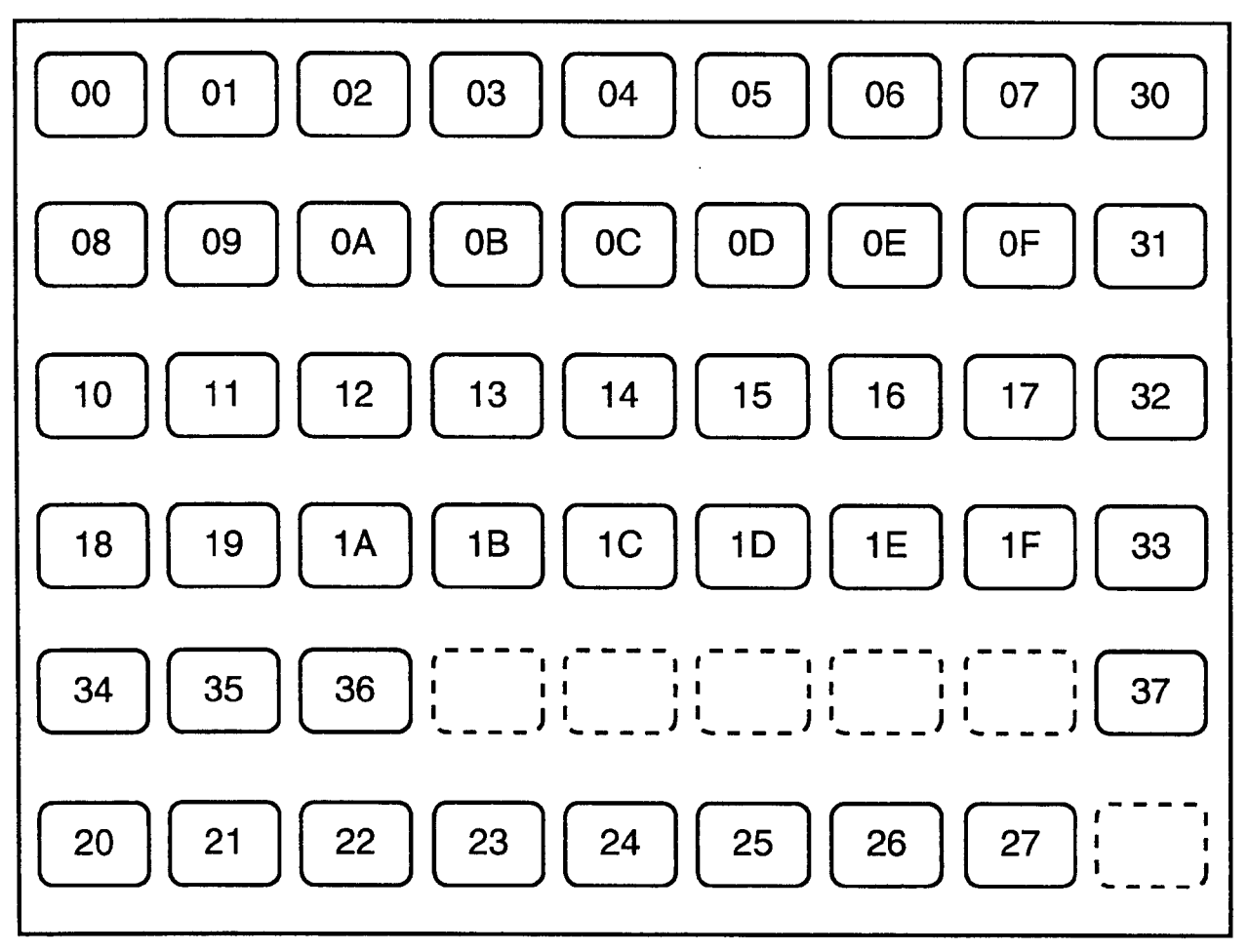

FIG. 7 shows a merged (6×9) row-column matrix as fed to the auxiliary interface firmware by the circuitry on interface board 410. This is a logical matrix within the CRIND® processing and represents a combination of the matrices for the standard keypad (PKP) and auxiliary keypad (AKP). The PiNpad area can be actuated by either the standard or auxiliary keypad. All other keys are unique to either the standard or auxiliary keypad. The auxiliary keypad non-PINpad keys occupy all of the $5^{th}$ row and $9^{th}$ column. The $6^{th}$ row has currently been reserved for future expansion of the standard keypad layout and has been assigned hexadecimal values of 20–27. Thus, the 54 locations allotted for by the (6×9) matrix of FIG. 7 are apportioned as follows. Thirty-two (32) are reserved for the current standard keypad. The hexadecimal values for these thirty-two keys range from 00–1F. Eight (8) are reserved for the auxiliary keypad and their hexadecimal values range from 30–37. Recall that the other twelve (12) keys of auxiliary keypad represent the PiNpad keys and have already been accounted for in standard keypad mapping. Eight (8) locations ranging from hexadecimal 20–27 have been reserved for future expansion of standard keypad. The remaining six (6) locations are currently blank.

Figure 8A:
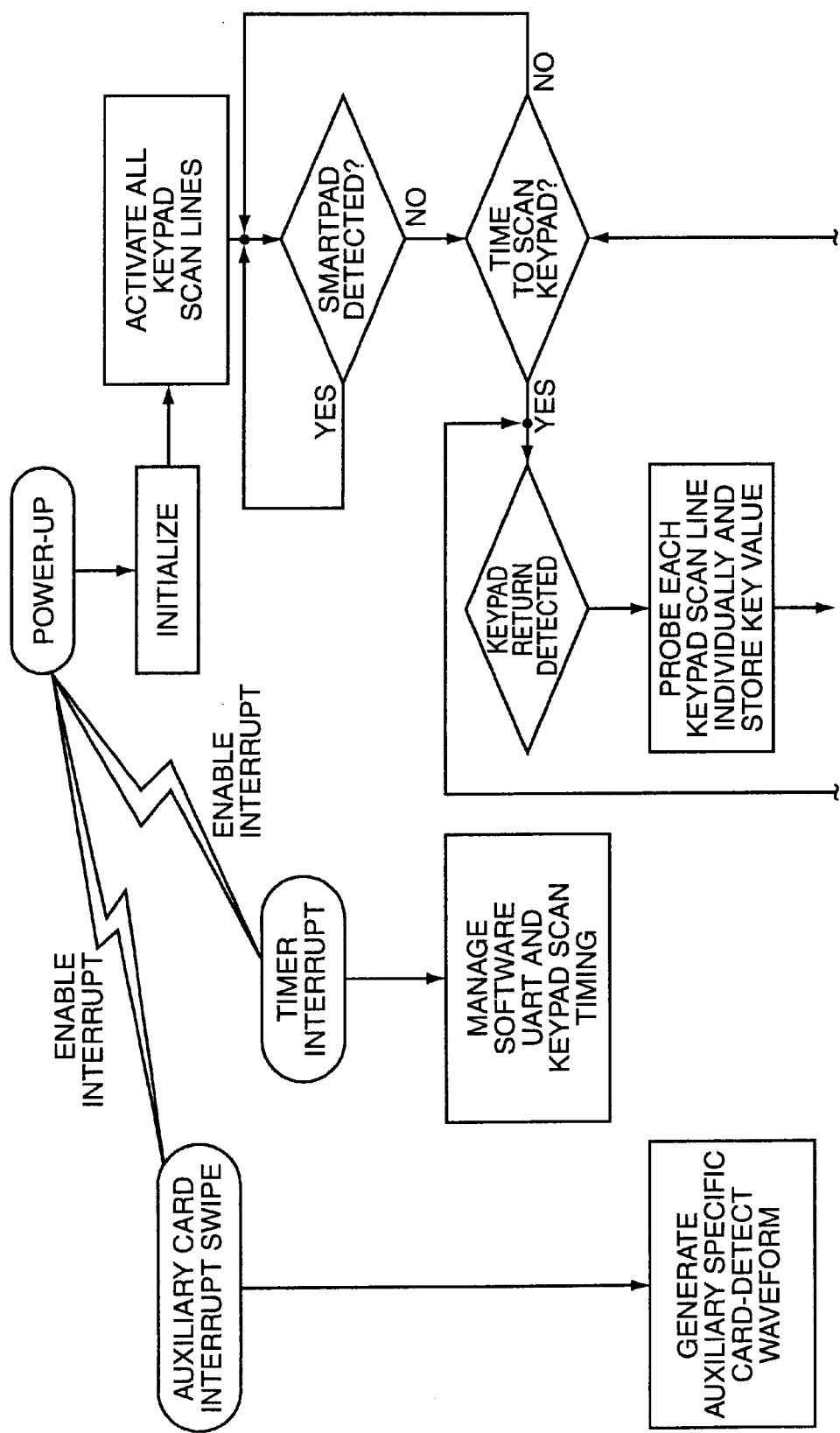
FIGS. 8a and 8b illustrate a flow diagram corresponding to the interface board shown in the block diagram of FIG. 4.
Figure 8B:
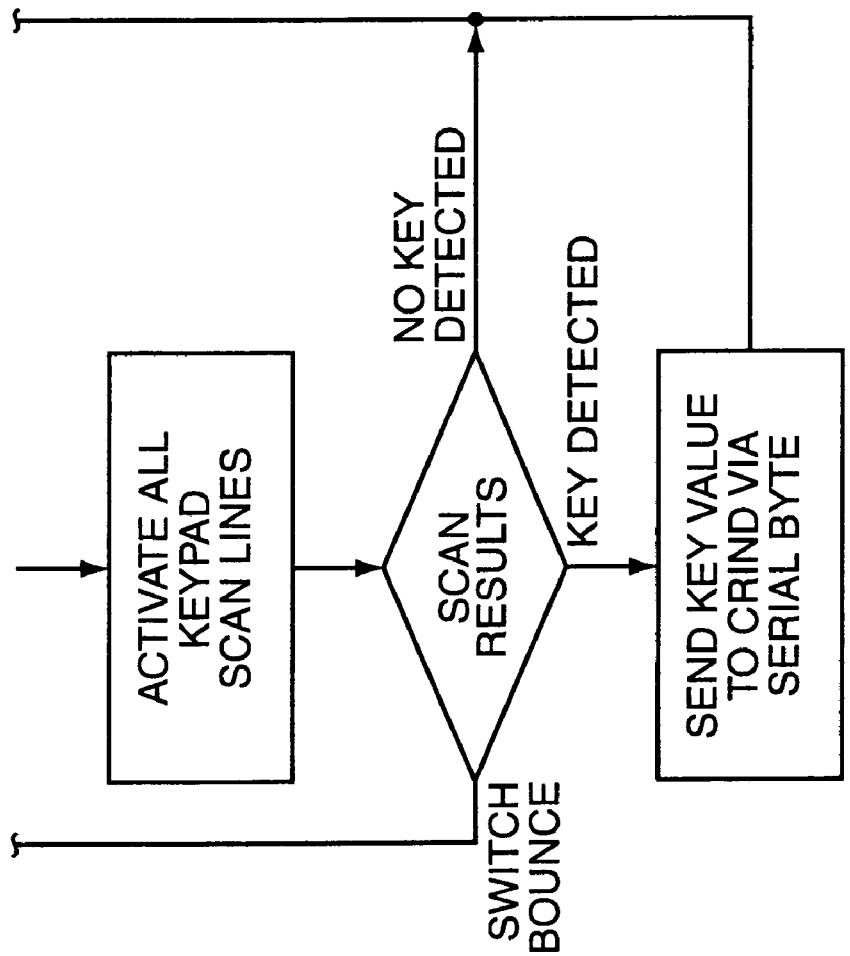

FIG. 8 contains a simplified flowchart describing the basic operation of the auxiliary interface firmware. After initialization, the firmware enters a simple loop in which it scans a key matrix fed by two keypads. When a valid keystroke is detected, the firmware transmits a byte associated with the location of the key pressed. At the beginning of each pass through the firmware loop, a test for the presence of a SmartPad is performed. If a SmartPad is detected, the firmware stops scanning for keystrokes until the SmartPad is no longer detected. This prevents interference with SmartPad serial communications.

At any time during operation of the auxiliary interface firmware, a card swipe can occur at auxiliary card reader (ACR). Such an event triggers an interrupt that causes the firmware to generate a card detect waveform distinguishable from standard card reader (PCR). That waveform is transmitted into circuitry that combines the signals from both card readers. This allows the CRIND® logic board to perform special operations that may assist a disabled operator.

It will be understood that various details of the invention may be changed without departing from the scope of the invention. For instance, the foregoing description uses the term fuel dispensing. Fuel dispensing, however, is not limited to fossil fuels such as oil or gasoline. Rather, fuel dispensing should be viewed as encompassing a device capable of dispensing any type of consumable energy source. Furthermore, the foregoing description is for the purpose of illustration only, and not for the purpose of limitation-the invention being defined by the claims.

What is claimed is:

1. A system for enabling a credit or debit transaction on a stand-alone attendant-less retail apparatus comprising:

(a) a primary reader for receiving data from an information bearing medium situated on the exterior housing of the stand-alone attendant-less retail apparatus;

(b) an auxiliary reader for receiving data from an information bearing medium situated on the exterior housing of the stand-alone attendant-less retail apparatus such that said auxiliary reader is accessible to handicapped individuals;

(c) an interface board coupled to said primary and auxiliary readers wherein said interface board receives data from said primary and auxiliary readers and is capable of distinguishing whether said primary or auxiliary reader is sending data wherein said interface board processes the incoming data and attaches identification information to an output signal indicating the original source of the input information; and (d) a local processing board coupled to said interface board for accepting and processing the output signal from said interface board and forwarding same to a processing device in order to verify and complete the desired transaction.

2. The system of claim 1 further comprising:

(e) a primary keypad proximate to said primary reader for receiving user input and forwarding same;

(f) an auxiliary keypad proximate to said auxiliary reader such that said auxiliary keypad is accessible to handicapped individuals for receiving user input and forwarding same; wherein said interface board is coupled to said primary and auxiliary keypads and receives data from said primary and auxiliary keypads and is capable of distinguishing whether said primary or auxiliary keypad is sending data wherein said interface board processes the incoming data and attaches identification information to an output signal indicating the original source of the input information.

3. The system of claim 2 wherein said primary keypad comprises:

(g) a set of twelve (12) PINpad keys arranged in a matrix configuration and corresponding to numerical values 0–9 and symbolic values "*" and "#"; and (h) a set function keys not necessarily arranged in any particular order, each associated with a definable function, wherein each key, numeric, symbolic, or function, has an associated hexadecimal value.

4. The system of claim 3 wherein said auxiliary keypad comprises:
(i) a set of twelve (12) PiNpad keys arranged in a matrix configuration and corresponding to numerical values 0–9 and symbolic values "*" and "#"; and
(j) a set function keys not necessarily arranged in any particular order, each associated with a definable function, wherein each key, numeric, symbolic, or function, has an associated hexadecimal value.

5. The system of claim 4 wherein the hexadecimal values of the PINpad keys for both the primary and auxiliary keypads are identical.

6. The system of claim 5 wherein the hexadecimal values for the function keys for both the primary and auxiliary keypads are unique.

7. The system of claim 6 wherein said interface board distinguishes the source of keypad information based on the hexadecimal value associated with a particular key except for PINpad keys whose source need not be distinguished and whose hexadecimal values are identical for both the primary and auxiliary keypads.

8. The system of claim 7 wherein the same function is capable of being programmed for unique function keys on both the primary and auxiliary keypads.

9. The system of claim 7 wherein the function keys on the auxiliary keypad are programmed with information to assist handicapped individuals.

10. The system of claim 7 wherein the local processing board is programmed with and can process the functions associated with the function keys of both the primary and auxiliary keypads.

11. The system of claim 1 wherein said information bearing medium is a magnetic strip encoded card.

12. The system of claim I wherein said information bearing medium is a bar coded encoded card.

13. The system of claim 1 wherein said information bearing medium is a biometrically encoded card.

14. The system of claim 1 wherein said information bearing medium is an RF transponder tag.

15. A retail system comprising:
a stand-alone attendant-less retail apparatus, further comprising:
a primary keypad:
an auxiliary keypad accessible to handicapped individuals; and
an interface board coupled to said primary keypad and said auxiliary keypad;
wherein said interface board receives data from said primary and auxiliary keypads and is capable of distinguishing whether said primary or auxiliary keypad is sending data; and
wherein said interface board processes the incoming data and attaches identification information to an output signal indicating the original source of the input information.

16. The system of claim 15 wherein said primary keypad comprises:
(a) a set of twelve (12) PINpad keys arranged in a matrix configuration and corresponding to numerical values 0–9 and symbolic values "*" and "#"; and
(b) a set function keys not necessarily arranged in any particular order, each associated with a definable function, wherein each key, numeric, symbolic, or function, has an associated hexadecimal value.

17. The system of claim 16 wherein said auxiliary keypad comprises:
(c) a set of twelve (12) PiNpad keys arranged in a matrix configuration and corresponding to numerical values 0–9 and symbolic values "*" and "#"; and
(i) a set function keys not necessarily arranged in any particular order, each associated with a definable function, wherein each key, numeric, symbolic, or function, has an associated hexadecimal value.

18. The system of claim 17 wherein the hexadecimal values of the PINpad keys for both the primary and auxiliary keypads are identical.

19. The system of claim 18 wherein the hexadecimal values for the function keys for both the primary and auxiliary keypads are unique.

20. The system of claim 19 wherein said interface board distinguishes the source of keypad information based on the hexadecimal value associated with a particular key except for PINpad keys whose source need not be distinguished and whose hexadecimal values are identical for both the primary and auxiliary keypads.

21. The system of claim 20 wherein the same function is capable of being programmed for unique function keys on both the primary and auxiliary keypads.

22. The system of claim 20 wherein the function keys on the auxiliary keypad are programmed with information to assist handicapped individuals.

23. A system for enabling a credit or debit transaction on a fuel dispensing apparatus comprising:
(a) a primary card reader for receiving data from an information bearing card situated on the exterior housing of the fuel dispensing apparatus; p1 (b) an auxiliary card reader for receiving data from an information bearing card situated on the exterior housing of the fuel dispensing apparatus such that said auxiliary card reader is accessible to handicapped individuals;
(c) a primary keypad proximate to said primary card reader for receiving user input via said primary keypad and forwarding same;
(d) an auxiliary keypad proximate to said auxiliary card reader such that said auxiliary card reader is accessible to handicapped individuals for receiving user input via said auxiliary keypad and forwarding same;
(e) an interface board coupled to said primary and auxiliary card readers and said primary and auxiliary keypads wherein said interface board receives data from said primary and auxiliary card readers and said primary and auxiliary keypads and is capable of distinguishing whether said primary or auxiliary card reader or said primary or auxiliary keypad is sending data wherein said interface board processes the incoming data and attaches identification information to an output signal indicating the original source of the input information; and
(f) a card reader board coupled to said interface board for accepting and processing the output signal from said interface board and forwarding same to a processing device in order to verify and complete the desired transaction.

24. The system of claim 23 wherein said information bearing card is a magnetic strip encoded card.

25. The system of claim 23 wherein said information bearing card is a bar coded encoded card.

26. The system of claim 23 wherein said information bearing card is a biometrically encoded card.

27. The system of claim 23 wherein said information bearing card is an RF transponder tag.

28. A system associated with a fuel dispensing apparatus for receiving input relating to fuel dispensing transactions from users, the system comprising:
(a) a first keypad locatable at a first height on the fuel dispensing apparatus for receiving input from users, the first height being accessible by handicapped users;
(b) a second keypad locatable at a second height on the fuel dispensing apparatus for receiving input from users, the second height being different from the first height; and
(c) an interface board coupled to the first and second keypads for identifying whether user input is received through the first keypad or the second keypad.

29. The system of claim 28 comprising a first card reader coupled to the interface board and locatable at or near the first height, the first card reader receiving user input from a card, wherein the interface board identifies whether user input is received from the first keypad, the second keypad, or the first card reader.

30. The system of claim 29 comprising a second card reader coupled to the interface board and locatable at or near the second height, the second card reader receiving user input from a card, wherein the interface board identifies whether user input is received from the first keypad, the second keypad, the first card reader, or the second card reader.

31. The system of claim 28 wherein the first and second keypads each comprise a plurality of switches and the interface board comprises a keypad scanner for detecting closure of the switches of the first and second keypads to identify keys being pressed by the user.

* * * * *